United States Patent [19]

Englander

[11] Patent Number: 5,203,484

[45] Date of Patent: Apr. 20, 1993

[54] BRACKET FOR TRANSPORTING A CYCLE

[75] Inventor: Curt Englander, Hillerstorp, Sweden

[73] Assignee: Industri AB Thule, Hillerstorp, Sweden

[21] Appl. No.: 669,394

[22] PCT Filed: Jul. 10, 1989

[86] PCT No.: PCT/SE89/00400

§ 371 Date: Mar. 13, 1991

§ 102(e) Date: Mar. 13, 1991

[87] PCT Pub. No.: WO90/02669

PCT Pub. Date: Mar. 22, 1990

[30] Foreign Application Priority Data

Sep. 13, 1988 [SE] Sweden .................................. 8803224

[51] Int. Cl.⁵ ................................................. B60R 9/00
[52] U.S. Cl. .............................. 224/324; 224/42.03 B; 224/323; 269/236; 269/270; 269/277
[58] Field of Search ................ 224/324, 323, 42.03 B; 211/17, 22; 269/236, 265, 268, 270, 277

[56] References Cited

U.S. PATENT DOCUMENTS 4,629,104 12/1986 Jacquet .................................. 224/324
4,887,754 12/1989 Boyer et al. ........................... 211/17

FOREIGN PATENT DOCUMENTS 3137348 8/1982 Fed. Rep. of Germany .
3104652 9/1982 Fed. Rep. of Germany .
3217319 12/1982 Fed. Rep. of Germany .
2251461 6/1975 France .

OTHER PUBLICATIONS

Bicycle Clamp, Yakima '89–'90 Catalog, p. 12, (only information available).

Primary Examiner—Linda J. Sholl
Attorney, Agent, or Firm—Burns, Doane, Swecker & Mathis

[57] ABSTRACT

A cycle bracket for transport of a cycle on a vehicle roof is provided with an anchorage strut secured to the vehicle roof and provided with two clamps which are adjustable to one another and which, by means of gripping members manufactured of a semi-rigid material, grasp about a frame tube in the cycle. The form of the gripping members is adjustable to the frame tube. In order to achieve simple and reliable adaptation of the gripping members, these include a jaw which is displaceable in the longitudinal direction of the clamp and which, together with an abutment fixedly disposed at the free end of the clamp, defines an accommodation space variable in both size and shape for the frame tube. Furthermore, the abutment portion is of one-piece manufacture with a flexible form-adapting member which is located between concave surfaces on the jaw and the frame tube.

16 Claims, 3 Drawing Sheets

BRACKET FOR TRANSPORTING A CYCLE

TECHNICAL FIELD

The present invention relates to a bracket for transport of a cycle on a vehicle and comprising an anchorage device which is connected to the vehicle and has two clamps adjustable to one another, the clamps being provided with gripping members which are operative, on adjustment of the clamps, to grasp about a frame tube included in the cycle, the form of the gripping members being adaptable to the frame tube.

BACKGROUND ART

A bracket for carrying cycles of the above-intimated type is previously known in this art and its gripping members are designed as non-rigid plastic pieces abutting against approximately semi-cylindrical surfaces in the clamps. In the concave mutually facing sides of the non-rigid plastic pieces, there are disposed profile bodies whose longitudinal direction is approximately parallel with the longitudinal direction of the tube which the bracket is intended to fixedly retain. At least some of these profile bodies are designed as hose profiles which may be clamped together so that the bracket will thereby be enabled to grasp about and fixedly retain a tube of relatively large diameter.

If the channels of the above-mentioned profile bodies are filled with a substantially rigid or slightly yieldable body, the configuration of the gripping members will be modified such that these will become adapted for fixed retention of slimmer tubes in that the above-mentioned hose-shaped profiles can no longer be clamped together to the flat state.

In certain cases, the above-intimated construction may perform well, but in such cases when the bracket is to be rapidly readjusted in order to be able to grasp between tubes of different dimensions, problems arise in that those pins which are used for filling out the hose-shaped profiles readily become jammed in the profiles so that they cannot be released without resort to auxiliary implements. A further considerable drawback is that the filler pins are loose details which are not reliably always to hand when they are needed. A further disadvantage inherent in the prior art construction resides in the fact that the adjustment range which can be achieved by employing the above-mentioned hose profiles and filler pins is very limited.

PROBLEM STRUCTURE

The object of the present invention is to realise a bracket of the type mentioned by way of introduction, the bracket being designed in such a manner that it has a large adjustment range, possibly in several steps, that it is not dependent upon any loose small parts for its function, and that, moreover, it makes for an extremely reliable fixed retention of the cycle. The present invention further has for its object to realise a bracket which is simple and economical in manufacture and permits both rapid and convenient adjustment.

SOLUTION

The objects forming the basis of the present invention will be attained if the bracket disclosed by way of introduction is characterized in that the gripping members include at least one part which is movably connected to at least the one clamp for adaptation to the frame tube by positional alteration of the part.

One preferred embodiment of the present invention is characterized in that the gripping members include an abutment portion disposed at the free end of each clamp and a jaw switchable, in the longitudinal direction of the clamp, towards and away from the abutment portion, the jaw having a concave surface turned to face the opposing clamp.

The preferred embodiment is suitably also characterized in that the abutment portion is connected to a flexible form-adapting member which, with its rear side, is supported against the jaw and, with its front side, is disposed to abut against the frame tube of the cycle.

BRIEF DESCRIPTION OF THE ACCOMPANYING DRAWINGS

The nature of the present invention and its aspects will be more readily understood from the following brief description of the accompanying Drawings, and discussion relating thereto.

In the accompanying Drawings

DESCRIPTION OF PREFERRED EMBODIMENT

Figure 1:
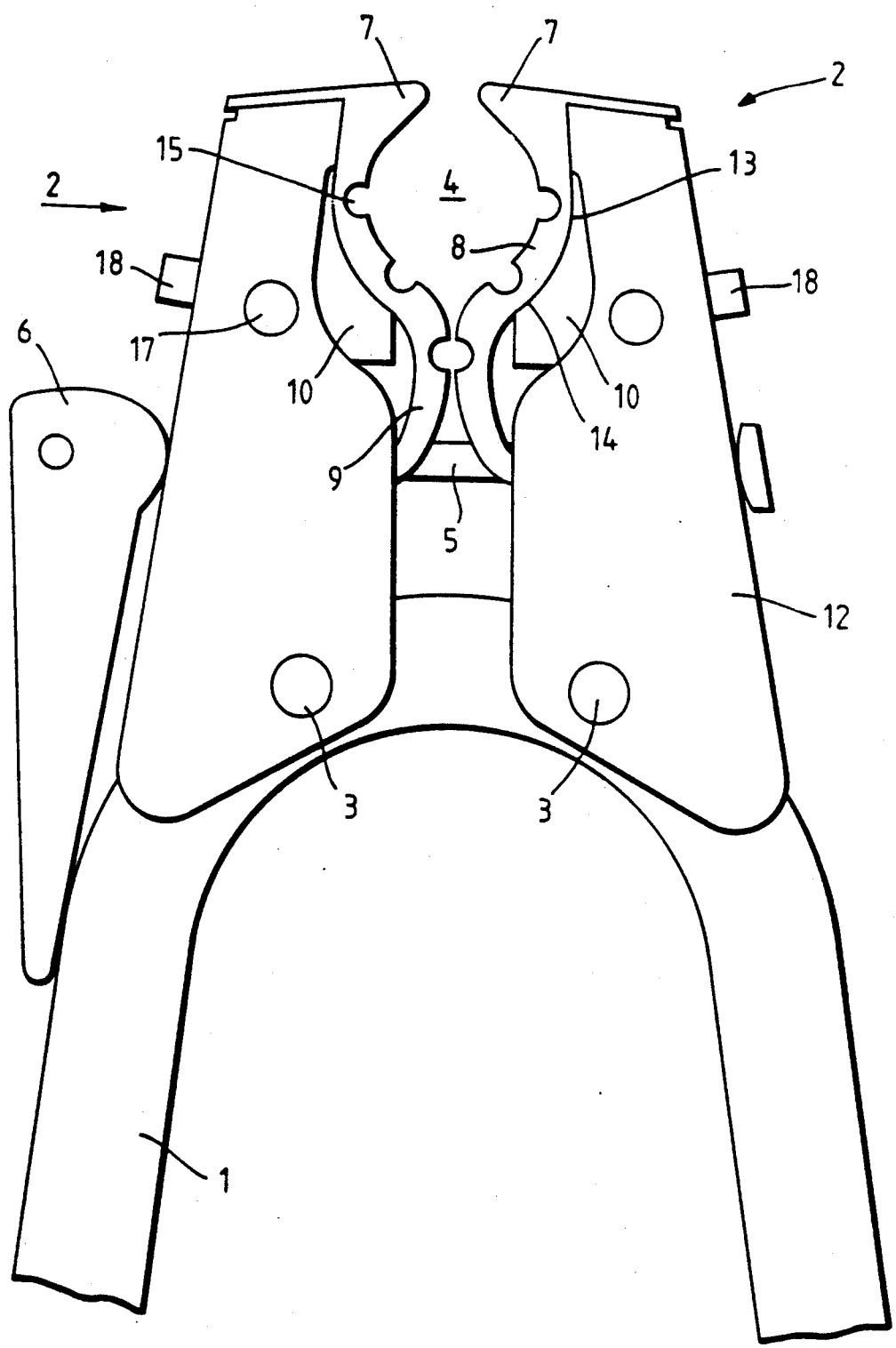
FIG. 1 shows a portion of a bracket which is intended, mounted on a vehicle roof, to grasp about a frame tube included in a cycle for transport of the cycle.

Referring to the Drawings, a bracket for cycles of the type encompassed by the present invention has two load-carrying struts which extend across a vehicle roof, transversely of the direction of travel of the vehicle and, in these load-carrying struts there are secured a number of channels extending in the longitudinal direction of the vehicle, in which channels the wheels of the cycles are accommodated and fixedly clamped. Transversely of the longitudinal direction of the channels, there is disposed an anchorage which pivotally fixes the lower end of that anchorage strut of which the upper end portion is illustrated in FIG. 1. Hence, the anchorage strut is pivotal about an axis which is at right angles to the longitudinal direction of the vehicle.

In its upper end portion, the anchorage strut 1 has two clamps 2 which are pivotal towards and away from one another and which are fixed, by means of joints 3, in the anchorage strut. An accommodation space 4 is disposed between the upper/outer ends of the clamps 2, in which space a tube included in a cycle frame is intended to be placed and fixedly clamped.

For operating the clamps 2 in a direction towards and away from one another and, thus, for clamping the frame tube included in the cycle frame in the accommodation space 4, use is made of a lever 5 with an eccentric lock 6. Furthermore, both of the clamps 2 are held in the position urged away from one another by means of a spring (not shown), so that automatic opening of the clamps will be achieved when the eccentric lock 6 is opened.

According to the present invention, the accommodation space 4 for the frame tube of the cycle should be of a size which can be varied so that a frame tube in a diameter range of from approx. 22 to approx. 50 mm can be fixedly retained by one and the same cycle bracket.

However, according to the present invention, the configuration of the accommodation space 4 may also be modified so that, for example, oval tubes may also be fixedly retained.

In the closed state of the eccentric lock 6, the accommodation space 4 is partly closed outwardly (in an upward direction in FIG. 1) by means of abutment portions 7 which are in the form of wedge-shaped noses projecting towards one another. In an inward direction, the abutment portions 7 merge into form-adapting members 8 which are made of a slightly flexible, semi-rigid material. The form-adapting members 8 extend inwardly between the clamps and are provided with inner end regions 9 which are accommodated between the two approximately mutually parallel shanks 12 which the clamps 2 have.

Since the form-adapting members 8 are flexible and deformable, they are not alone capable of withstanding the abutment force which occurs when the shanks 12 are clamped, with the assistance of the eccentric lock 6, about a tube placed in the accommodation space 4. Thus, the form-adapting members 8 are supported against adjustable jaws 10 which are displaceably accommodated in between both of the shanks 12 of the clamps 2 and which, with their end surfaces facing away from one another in FIG. 1, abut interiorly against that portion 11 of the clamp which interconnects both of the shanks 12 with each other. Thus, the clamps are approximately U-shaped in cross-section. At their sides facing one another, the jaws 10 have concave surfaces 13, and the lower/inner ends thereof have curved portions 14 which will be counter-directed to the abutment portions 7.

On their inner surfaces (facing towards the accommodation space 4), the form-adapting members 8 are provided with a number of recesses 15 whose longitudinal direction is approximately parallel with the longitudinal direction of a tube fixedly clamped in the accommodation space 4. The purpose of the recesses 15 is partly to render the form-adapting members 8 more yieldable, and partly to provide space for, for example, a cable which may be mounted on the frame tube of the cycle.

Figure 2:
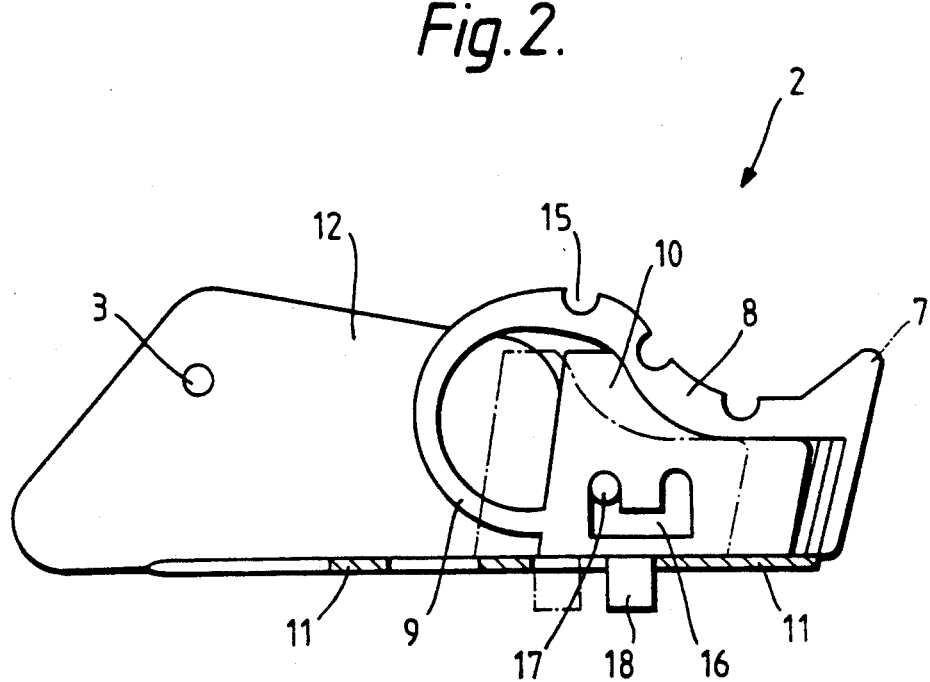
FIG. 2 is a longitudinal central cross-section through the one of the clamps included in the bracket.

FIG. 2 shows a longitudinal section through a clamp 2. It will be apparent from the Figure that the abutment 7, the form-adapting member 8 and the jaw 10 are of one-piece construction, and that the jaw and the form-adapting member 8 are interconnected by the intermediary of the inner end regions 9.

The jaw 10 has a transverse, U-shaped recess 16 through which a pin 17 is passed, the pin being rivetted on the outsides of the shanks 12. Hereby, the jaw 10 may be adjusted from the position shown by solid lines in FIG. 2 to the position shown by broken lines in the same Figure. As assistance in this adjustment, use is made of the projection 18 which extends through an aperture in the back portion 11 of the clamp 2.

In the position of the jaw 10 shown by broken lines in FIG. 2, the form-adapting member 8 is urged downwardly in the Figure so that its rear side will follow the upwardly concave inside of the jaw. Hereby, the accommodation space 4 will have a considerably larger diameter than is the case in the position illustrated in FIG. 1, such that a frame tube of substantially larger diameter may hereby be fixedly secured.

By an adaptation of the arching of the configuration of the surface 13, it is also possible to design the cycle bracket so that it can grasp about a frame tube of oval cross-section.

Another method of influencing the configuration of the accommodation space 4 on re-adjustment of the jaw 10 is to dispose, between the back portion 11 of the clamp 2 and the jaw 10, a sliding surface which may be arched, wedge-shaped, stepped or the like. There will hereby be obtained, on re-adjustment of the jaw 10, in addition to the modification of the distance between the curved surface 14 and the abutment portion 7, also a twisting (about an axis which is approximately parallel to the pin 17) of the jaw, or a modification of the distance towards or away from the back 11 of the clamp 2.

While not being apparent from the Drawing, the extent of the form-adapting member 8 at right angles to the plane of the Drawing in FIG. 1 is greater than the extent in the same direction of both of the clamps. This implies that the rear side of the form-adapting member 8 (facing towards the jaws 10 and the clamps) may, when the jaws 10 are located in their inner/lower positions, abut against the edges of the shanks 12 facing one another. Hereby, the form-adapting member 8 will be supported not only by the jaw but also by the shanks 12, which may have flared edges so as to increase the abutment surface against the form-adapting member 8.

At their outer ends, both of the shanks 12 are provided with noses directed towards one another and accommodated in interior grooves or spaces in the abutment portions 7, whereby these are rigidified to extremely good mechanical strength.

DESCRIPTION OF ALTERNATIVE EMBODIMENTS

Figure 3:
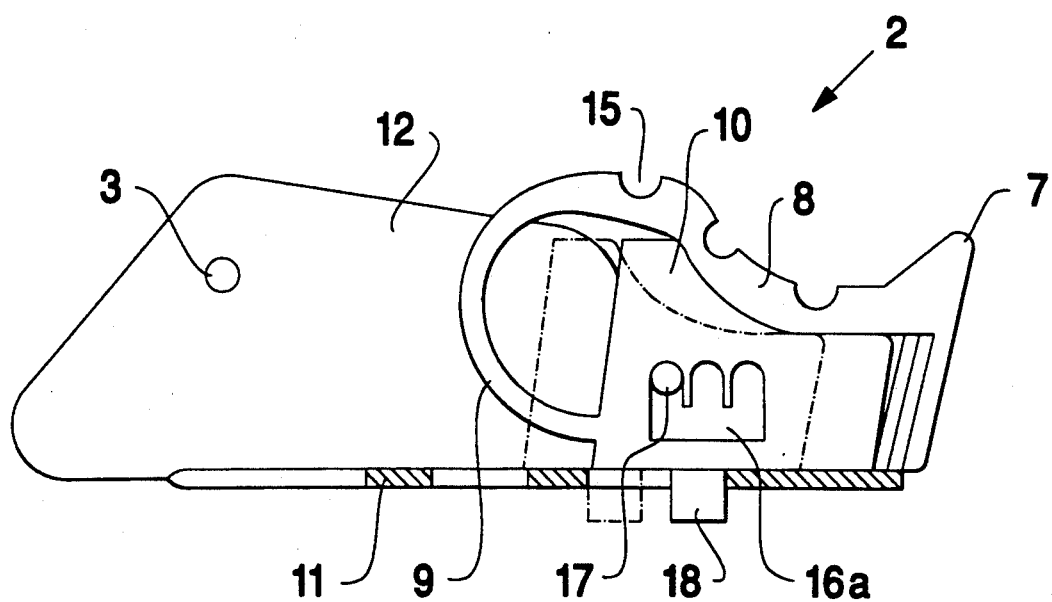
FIG. 3 is a cross-sectional view of an embodiment of a clamp.

In the foregoing, the recess 16 in which the pin 17 is accommodated in the jaw 10 has been described as being U-shaped. This corresponds to two different adjustment positions for the jaw 10. However, the recess 16 may be of other configuration, so that it has three parallel branches which correspond to three different adjustment positions of the jaw. The configuration of the recess 16a as shown in FIG. 3 is E-shaped.

As one alternative to continual adjustment of the position of the jaw, it is conceivable to employ a screw which extends in the longitudinal direction of the clamp 2, possibly parallel with the back portion 11. Such a screw is accommodated in a longitudinal bore in the jaw and is in threaded engagement with a nut in this bore.

If the jaw is designed to be slightly higher than that shown in FIG. 2, it would be possible, in an alternative embodiment, to dispense with the form-adapting member 8. In such instance, fixed clamping of the frame tube of the cycle would take place directly against the jaw and against the abutment portion 7. In this case, the clamping surface of the jaw should, of course, be designed in a manner which corresponds to the design of the clamping surface of the form-adapting member.

As an alternative to the above-described displaceable jaw which rests against the back portion 11 of the clamp, a jaw designed approximately as a roller is conceivable, this being accommodated in between both of the shanks 12 and rolling against the back portion 11 or against a profiled interlay resting against the back and with the above-described function. Granted, in this embodiment, no surface abutment against the frame tube is attained, but this notwithstanding, inward and downward closing of the frame tube will be achieved so that the frame tube is reliably clamped in place. The above-mentioned roller is provided with a through shaft which extends through slot-shaped apertures in the shanks 12, the slot-shaped apertures being provided with broadened portions in a direction towards the back 11 for fixedly retaining the shaft.

In yet a further alternative embodiment, the jaw 10 may be replaced by a pivotal portion which is pivotal about a shaft approximately parallel with the above-described pin 17. This shaft is located as close as is practically possible to the back portion 11. On pivoting and locking of such a pivotal jaw in a clockwise direction (in FIG. 2), the bracket will be adapted so as to cooperate with a frame tube of smaller diameter, while a pivoting in the opposite direction will adapt the bracket to a frame tube of larger diameter.

The present invention should not be considered as restricted to that described above and shown on the Drawings, many modifications being conceivable without departing from the spirit and scope of the appended claims.

I claim:

1. A holder for transportation of a bicycle on a vehicle comprising an anchorage device connected to the vehicle and having two clamps adjustable relative to one another, said clamps having gripping members provided for gripping a frame tube of the bicycle when tightening said clamps, the shape of said gripping members being adaptable to the frame tube, said gripping members comprising one abutment member and one jaw provided on each clamp, said abutment member and said jaw defining a portion of an accommodation space for accommodating the frame tube, said jaw being movable relative to said abutment member in said clamp to adjust the size of the accommodation space, said jaw having a concave surface facing an opposite one of the clamps.

2. A holder as claimed in claim 1, wherein said abutment member is connected to a flexible form-adapting member, the back side of said form adapting member being supported on the jaw and the front side of said form adapting member being adapted for contacting a frame tube of the bicycle.

3. A holder as claimed in claim 2, wherein said form-adapting member has, in the front side thereof, at least one recess, a longitudinal direction of said recess being approximately parallel to a longitudinal direction of the frame tube of the bicycle.

4. A holder as claimed in claim 2, wherein said abutment member and said form-adapting member are integrally made from a flexible, elastic material.

5. A holder as claimed in claim 2, wherein said jaw and said form-adapting member are integrally made.

6. A holder as claimed in claim 1, wherein each of said clamps has two shanks parallel to one another, the shiftable jaw being received therebetween and displaceable substantially in the longitudinal direction of the clamps.

7. A holder as claimed in claim 1, wherein each of said clamps has a back surface against which the jaw abuts.

8. A holder for transportation of a bicycle on a vehicle, comprising:
an anchorage device connected to the vehicle and having two clamps adjustable toward and away from one another;
gripping members provided on each of the clamps, said gripping members defining an accommodation space for receiving and gripping a frame member of a bicycle, said gripping members comprising one abutment member provided on each clamp and one jaw provided on each clamp, said jaw being shiftable toward and away from said abutment member in said clamp, said jaw having a concave surface facing an opposite one of the clamps;
wherein each of said clamps has a pin approximately parallel to the frame tube, said pin extending through parallel portions of a shaped recess in said jaw to position said jaw in said clamp when said pin is received in one of the parallel portions of the recess.

9. A holder as claimed in claim 8, wherein the shaped recess is E-shaped.

10. A holder as claimed in claim 8, wherein the shaped recess is U-shaped.

11. A holder for transportation of a bicycle on a vehicle comprising:
an anchorage device connected to the vehicle and having two clamps adjustable toward and away from one another;
gripping members provided on each of the clamps, said gripping members defining an accommodation space for receiving and gripping a frame member of a bicycle and being made of semi-hard deformable material;
said gripping members each including a form adapting member for adapting the shape of the accommodation space to a particular frame member and a jaw for supporting said form adapting member on the clamps, said jaw being movable to change the shape of said form adapting member, thereby changing the shape of the accommodation space, said jaw further having a concave support surface supporting said form adapting member.

12. A holder as claimed in claim 11, wherein said form adapting members have, in a front side thereof, at least one recess, a longitudinal direction of said recess being approximately parallel to a longitudinal direction of the frame member of the bicycle.

13. A holder for transportation of a bicycle on a vehicle comprising:
an anchorage device connected to the vehicle and having two clamps adjustable toward and away from one another;
gripping members provided on each of the clamps, said gripping members defining an accommodation space for receiving and gripping a frame member of a bicycle, each of the clamps having U-shaped cross sections with shank portions interconnected by a support portion;
said gripping members each including a form adapting member for adapting the shape of the accommodation space to a particular frame member and a jaw that is movable between the shank portions and supported on the support portions of each clamp, said jaw having a concave surface on a side thereof for supporting said form adapting member, said form adapting members defining a portion of the accommodation space and being arranged to change the shape of the accommodation space as a result of movement of said jaw.

14. A holder as claimed in claim 13, wherein said form adapting members have, in a front side thereof, at least one recess, a longitudinal direction of said recess being approximately parallel to a longitudinal direction of the frame member of the bicycle.

15. A holder for transportation of a bicycle on a vehicle comprising:

an anchorage device connected to the vehicle and having two clamps adjustable toward and away from one another;
gripping members provided on each of the clamps, the gripping members defining an accommodation space for receiving and gripping a frame member of a bicycle; and
said gripping members each including a form adapting member for adapting the shape of the accommodation space to a particular frame member and a jaw for supporting said form adapting member on the clamps, and a protruding abutment member partially closing an open side of the accommodation space, said jaw being movable relative to said abutment member to change the shape of the form adapting member, thereby changing the shape of the accommodation space.

16. A holder as claimed in claim 15, wherein said form adapting members have, in a front side thereof, at least one recess, a longitudinal direction of said recess being approximately parallel to a longitudinal direction of the frame member of the bicycle.

* * * * *